(12) United States Patent
Miyata et al.

(10) Patent No.: US 10,702,955 B2
(45) Date of Patent: Jul. 7, 2020

(54) FLUX-CORED WIRE FOR GAS-SHIELDED ARC WELDING AND WELDING METHOD

(71) Applicant: Kobe Steel, Ltd., Kobe-shi (JP)

(72) Inventors: Minoru Miyata, Fujisawa (JP); Reiichi Suzuki, Fujisawa (JP); Kei Yamazaki, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 278 days.

(21) Appl. No.: 15/567,833

(22) PCT Filed: Apr. 22, 2016

(86) PCT No.: PCT/JP2016/062843
§ 371 (c)(1),
(2) Date: Oct. 19, 2017

(87) PCT Pub. No.: WO2016/175154
PCT Pub. Date: Nov. 3, 2016

(65) Prior Publication Data
US 2018/0104773 A1  Apr. 19, 2018

(30) Foreign Application Priority Data

Apr. 28, 2015  (JP) .................................. 2015-091985

(51) Int. Cl.
*B23K 35/30* (2006.01)
*B23K 9/16* (2006.01)
(Continued)

(52) U.S. Cl.
CPC ............ *B23K 35/3073* (2013.01); *B23K 9/16* (2013.01); *B23K 35/30* (2013.01); *B23K 35/368* (2013.01);
(Continued)

(58) Field of Classification Search
CPC .... B23K 35/3073; B23K 9/16; B23K 35/368; B23K 2203/04
(Continued)

(56) References Cited

U.S. PATENT DOCUMENTS

| | | | |
|---|---|---|---|
| 6,264,760 B1* | 7/2001 | Tamehiro | ................. C21D 1/19 |
| | | | 148/330 |
| 2011/0114606 A1* | 5/2011 | Suzuki | ............... B23K 35/0266 |
| | | | 219/74 |
| 2013/0315777 A1 | 11/2013 | Nako et al. | |

FOREIGN PATENT DOCUMENTS

| | | |
|---|---|---|
| JP | 8-281475 A | 10/1996 |
| JP | 2004-268056 A | 9/2004 |

(Continued)

OTHER PUBLICATIONS

Extended European Search Report dated Aug. 21, 2018 in Patent Application No. 16786431.3, 9 pages.

(Continued)

*Primary Examiner* — Thien S Tran
(74) *Attorney, Agent, or Firm* — Oblon, McClelland, Maier & Neustadt, L.L.P.

(57) ABSTRACT

The purpose of the present invention is to provide a flux cored wire which has good high-temperature cracking resistance, and which enables the achievement of a welded part exhibiting excellent coating adhesion. The present invention relates to a metal flux cored wire for gas-shielded arc welding, which contains, relative to the total mass of the wire, 0.02-0.30% by mass of C, 0.3-1.5% by mass of Si, 0.3-2.5% by mass of Mn, and oxide of at least one element selected from the group consisting of Si, Cr and Ni in an amount of 0.01-0.30% by mass in total, 0.020% by mass or less of S, and 0.3% by mass or less of Al, Ca, Mg, K and Na (Continued)

in total in the form of metals or alloys, with the balance made up of Fe and unavoidable impurities.

11 Claims, 1 Drawing Sheet

(51) Int. Cl.
    *B23K 35/368*     (2006.01)
    *C22C 38/04*     (2006.01)
    *C22C 38/00*     (2006.01)
    *C22C 38/02*     (2006.01)
    *C22C 38/06*     (2006.01)
    *B23K 103/04*     (2006.01)

(52) U.S. Cl.
    CPC ............ *C22C 38/002* (2013.01); *C22C 38/02* (2013.01); *C22C 38/04* (2013.01); *C22C 38/06* (2013.01); *B23K 2103/04* (2018.08); *C22C 38/00* (2013.01)

(58) Field of Classification Search
    USPC .................. 219/74, 137 WM, 146.1, 146.22
    See application file for complete search history.

(56) References Cited

FOREIGN PATENT DOCUMENTS

| | | |
|---|---|---|
| JP | 2006-272405 A | 10/2006 |
| JP | 2012-81514 A | 4/2012 |
| JP | 2012081514 A * | 4/2012 |

OTHER PUBLICATIONS

International Search Report dated Aug. 2, 2016 in PCT/JP2016/062843 filed Apr. 22, 2016.

* cited by examiner

FLUX-CORED WIRE FOR GAS-SHIELDED ARC WELDING AND WELDING METHOD

TECHNICAL FIELD

The present invention relates to a flux-cored wire for gas-shielded arc welding and a welding method using the flux-cored wire. More particularly, the present invention relates to a flux-cored wire for gas-shielded arc welding for use in applications involving coating after welding, and to a welding method using the same.

BACKGROUND ART

In general, vehicle parts, such as automotive parts, are subjected to a coating process after welding to improve the corrosion resistance and appearance. In the process, if there is slag on the weld bead, the coating material may be repelled by the slag, which can result in a coating defect. Thus, for welding of a thin steel sheet for, for example, automotive parts, welding wires that do not generate much slag, such as a solid wire and a metallic flux-cored wire, are conventionally used.

Welding is a process that achieves joining by melting metal, and thus an oxide film inevitably forms on the weld, which is, in a heated condition, exposed to atmospheric air. Oxide films hinder good chemical conversion and coating, which can result in a decrease in coating adhesion. In addition, if the adhesion of the oxide film that forms on the weld bead is not sufficient, the oxide film can easily peel off when the coated portion is subjected to an impact, for example, by a bouncing stone, and the oxide film can delaminate together with the coating provided thereon.

Thus, because of the slag and the oxide film that form on the weld bead, it is difficult for the weld to exhibit coating properties comparable to those of the steel sheet. Delamination of a coating results in a decrease in corrosion resistance and corrosion life, and therefore the weld is regarded as an area where corrosion resistance is particularly low. In view of this, various studies have been conducted in the related art in order to improve the coating properties and other properties of the weld (see PTLs 1 to 3, for example).

For example, PTL 1 describes a flux-cored wire having a wire composition in which one or more of C, Si, Mn, Nb, V and P are contained in a specified amount, the content of a slagging agent is less than or equal to 1.0 mass %, and the ratio between FeO and $SiO_2$ ($FeO/SiO_2$) in the slagging agent is greater than or equal to 1.0. This is intended to improve adhesion between the slag and the coating and between the slag and the weld bead.

PTL 2 describes a flux-cored wire in which graphite is added to the flux to reduce the amount of slag formed. Graphite reacts with oxygen in the weld metal to form CO and $CO_2$ gas. Thus, the weld metal is deoxidized, and consequently deoxidation by, for example, Si or Mn is inhibited, and as a result, the amount of slag formed is reduced.

PTL 3 describes a welding wire in which Ni and Cr are added to the welding wire to form a thin adhesive oxide film on the surface of the weld bead. This is intended to improve the delamination resistance of the oxide film and the coating.

CITATION LIST

Patent Literature

PTL 1: Japanese Unexamined Patent Application Publication No. 8-281475

PTL 2: Japanese Unexamined Patent Application Publication No. 2006-272405

PTL 3: Japanese Unexamined Patent Application Publication No. 2004-268056

SUMMARY OF INVENTION

Technical Problem

Coated portions of vehicle parts need to be free of regions having coating defects and to have good coating adhesion. The flux-cored wire described in PTL 1 contributes to improving the adhesion of the slag. However, since no consideration is given to the adhesion of the oxide film, it is difficult, with this technique, to improve the coating adhesion of the surface of the weld bead excluding the slag area.

The flux-cored wire described in PTL 2 is capable of reducing regions of coating defects. However, graphite, when added to a flux, causes an increase in the amount of spatter generation and a decrease in hot cracking resistance. Furthermore, the flux-cored wire described in PTL 2 is configured so that the amount of slag formed at the weld can be reduced, thereby improving the coating adhesion. However, the decrease in coating adhesion due to the oxide film is not considered.

The welding wire described in PTL 3 contains Cr and Ni, actively added, and therefore may have decreased hot cracking resistance. Furthermore, when an Ar-rich shielding gas is used, Cr, added as an alloying element, may not necessarily migrate to or near to the oxide film, and therefore the effect of improving the adhesion of the oxide film may not necessarily be produced consistently and sufficiently.

Accordingly, an object of the present invention is to provide a flux-cored wire that achieves a weld having good hot cracking resistance and excellent coating adhesion, and to provide a welding method using the same.

Solution to Problem

According to the present invention, a metallic flux-cored wire for gas-shielded arc welding is a metallic flux-cored wire including a steel sheath filled with a metallic flux. The metallic flux-cored wire includes, based on the total mass of the wire, C in an amount ranging from 0.02 to 0.30 mass %, Si in an amount ranging from 0.3 to 1.5 mass %, Mn in an amount ranging from 0.3 to 2.5 mass %, at least one oxide selected from the group consisting of silicon oxide, chromium oxide, and nickel oxide in a total amount ranging from 0.01 to 0.30 mass %, S in an amount of less than or equal to 0.020 mass %, and Al, Ca, Mg, K, and Na each in elemental or alloy form in a total amount of less than or equal to 0.3 mass %, with the balance being Fe and incidental impurities.

In the metallic flux-cored wire for gas-shielded arc welding, a P content may be less than or equal to 0.020 mass % based on the total mass of the wire.

In the metallic flux, a S content may be less than or equal to 0.025 mass % based on the total mass of the metallic flux.

Further, in the metallic flux-cored wire for gas-shielded arc welding according to the present invention, a Ti content may be less than or equal to 0.5 mass % based on the total mass of the wire.

Furthermore, in the metallic flux-cored wire for gas-shielded arc welding according to the present invention, the S content may be less than or equal to 0.009 mass % based on the total mass of the wire.

A welding method according to the present invention includes gas-shielded arc welding a workpiece by using any one of the metallic flux-cored wires described above. The workpiece is a steel containing Si in an amount ranging from 0.1 to 1.0 mass % based on the total mass of the steel.

In the welding method, the method may use, for example, a shielding gas containing, based on the total volume of the shielding gas, Ar in an amount ranging from 95 to 100 volume % and an oxidizing gas in an amount ranging from 0 to 5 volume %.

The oxidizing gas may be at least one gas of $CO_2$ and $O_2$.

Advantageous Effects of Invention

According to the present invention, a metallic flux-cored wire contains a very small amount of oxide added thereto and, as a result, achieves a weld having both good hot cracking resistance and excellent coating adhesion.

DESCRIPTION OF EMBODIMENTS

Embodiments of the present invention will be described below in detail. The present invention is not limited to the embodiments described below.

As used herein, "wt. %" and "mass %" have the same meaning. Numerical ranges recited herein using "to" include the values preceding and following the "to", which are the lower limit and the upper limit, respectively.

(Mechanism for Improving Adhesion of Oxide Film)

Figure 1:
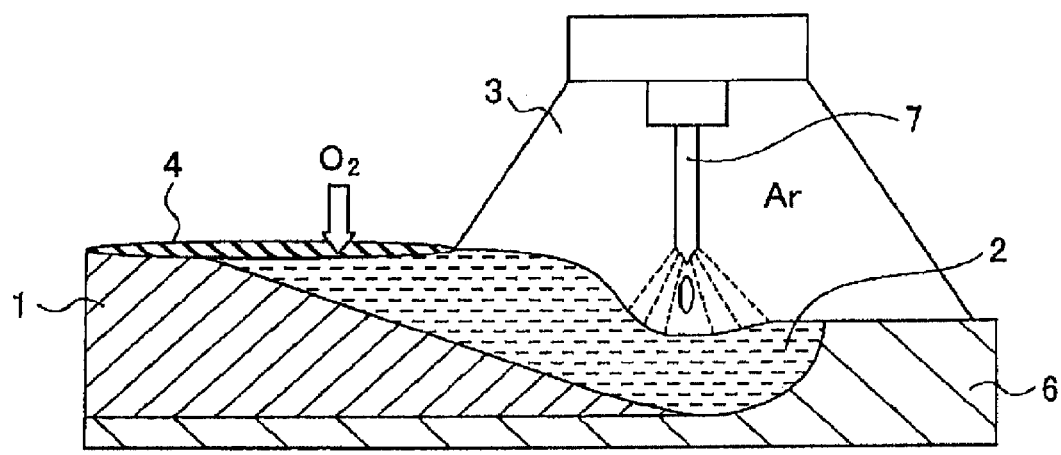
FIG. 1 is a schematic diagram illustrating formation of an oxide film.

FIG. 1 is a schematic diagram illustrating formation of an oxide film. As illustrated in FIG. 1, the surface of the weld bead (weld metal 1) is oxidized by oxygen ($O_2$) in a shielding gas 3 and in atmospheric air after the molten metal (molten pool 2) has solidified. Thus, even if a noble gas such as Ar is used as the shielding gas 3 to perform welding, an oxide film 4, approximately several micrometers thick, inevitably forms. When an electrodeposition process is performed, a conventional practice is to perform a zinc phosphating pretreatment. However, if, for example, an oxide film is present on the surface of the steel sheet, the oxide film interferes with the formation of a zinc phosphate film, and as a result, a dense zinc phosphate film cannot be formed. Such a region has low adhesion to an electrodeposited coating.

The oxide film 4, which inevitably forms on the surface of the weld metal 1, is typically very brittle and peels off easily. Therefore, the weld is regarded as a region having minimum coating adhesion and can be a cause of corrosion.

The present inventors diligently performed experimentation and research to solve the above-described problems and consequently discovered that, when a metallic wire contains at least one oxide selected from the group consisting of Si oxide, Cr oxide, and Ni oxide added thereto in a specified amount, a highly adhesive oxide film, such as a film of fayalite, can be formed on the surface of the bead after welding.

(Metallic Flux-Cored Wire)

The metallic flux-cored wire of this embodiment includes a steel sheath filled with a flux and is used for gas-shielded arc welding. The metallic flux-cored wire of this embodiment contains, based on the total mass of the wire, C in an amount ranging from 0.02 to 0.30 mass %, Si in an amount ranging from 0.3 to 1.5 mass %, Mn in an amount ranging from 0.3 to 2.5 mass %, at least one oxide selected from the group consisting of silicon oxide, chromium oxide, and nickel oxide in a total amount ranging from 0.01 to 0.30 mass %, S in an amount of less than or equal to 0.020 mass %, and Al, Ca, Mg, K, and Na each in elemental or alloy form in a total amount of less than or equal to 0.3 mass %.

The metallic flux-cored wire of this embodiment may contain P or Ti, for example, in addition to the components described above. In such a case, based on the total mass of the wire, the P content is preferably less than or equal to 0.020 mass %, which is the upper limit. The Ti content is preferably less than or equal to 0.5 mass %.

Furthermore, in the metallic flux, based on the total mass of the flux, the S content is preferably less than or equal to 0.025 mass %, which is the upper limit. Furthermore, the S content, based on the total mass of the wire, is preferably less than or equal to 0.009 mass %.

The components other than the components described above in the metallic flux-cored wire of this embodiment, i.e., the balance, are Fe and incidental impurities.

The outside diameter of the metallic flux-cored wire of this embodiment is not particularly limited and, for example, ranges from 0.8 to 2.0 mm. The flux content may be set to any value provided that the components in the wire fall within the ranges described above. However, from the standpoint of wire drawability and workability (e.g., feedability) during welding, the flux content preferably ranges from 10 to 25 mass % based on the total mass of the wire.

Next, the reasons for the numerical limitations on the components included in the metallic flux-cored wire of this embodiment will be described. The contents of the components described below can be determined by dissolving the wire in an acid, for example, and performing measurements by inductively coupled plasma (ICP) spectroscopy.

[C: 0.02 to 0.30 Mass %]

C has the effect of improving the strength of the weld metal. However, if the C content is less than 0.02 mass % based on the total mass of the wire, the effect cannot be achieved sufficiently, which results in a weld having insufficient strength. On the other hand, if the C content is greater than 0.30 mass %, the amount of spatter generation increases and the strength becomes excessively high, which results in an increased probability of cracking. It is known that steel sheets exhibit lower coating adhesion at or near the areas where spatter settles, and therefore the amount of spatter generation has a significant influence on the coating adhesion.

Accordingly, the C content is specified to be from 0.02 to 0.30 mass % based on the total mass of the wire. From the standpoint of increasing the coating adhesion, the C content is preferably from 0.02 to 0.15 mass %.

[Si: 0.3 to 1.5 Mass %]

Si has the effect of smoothing the shapes of weld bead toes and improving the fatigue strength and also serves to react with oxygen in atmospheric air to form fayalite on the weld bead. However, if the Si content is less than 0.3 mass % based on the total mass of the wire, these effects cannot be achieved sufficiently, which results in an oxide film having lower adhesion. On the other hand, if the Si content is greater than 1.5 mass % based on the total mass of the wire, the probability of hot cracking increases.

Accordingly, the Si content is specified to be from 0.3 to 1.5 mass % based on the total mass of the wire. Preferably, the Si content is from 0.6 to 1.2 mass %. This results in the formation of an oxide film that has even higher adhesion and inhibition of hot cracking.

[Mn: 0.3 to 2.5 Mass %]

Mn has the effect of increasing the strength of the weld metal and fixes S, which can affect the hot cracking resistance of the weld metal, by forming MnS to inhibit hot cracking. However, if the Mn content is less than 0.3 mass % based on the total mass of the wire, these effects cannot be achieved sufficiently. On the other hand, if the Mn content is greater than 2.5 mass % based on the total mass of the wire, the weld metal becomes excessively hard to increase the probability of hot cracking and decrease the toughness. Accordingly, the Mn content is specified to be from 0.3 to 2.5 mass % based on the total mass of the wire.

[Silicon Oxide, Chromium Oxide, and Nickel Oxide: 0.01 to 0.30 Mass %]

At least one oxide selected from the group consisting of silicon oxide, chromium oxide, and nickel oxide is added to the wire. This results in formation of a dense oxide film layer on the surface of the weld bead, which leads to the effect of preventing delamination of the coating and improving the corrosion resistance of the weld. However, if the total content of the silicon oxide, the chromium oxide, and the nickel oxide is less than 0.01 mass % based on the total mass of the wire, these effects cannot be achieved sufficiently because the oxide film cannot be formed to a sufficient thickness. If the total content of the silicon oxide, the chromium oxide, and the nickel oxide is greater than 0.30 mass %, the excess forms slag, which is separate from the oxide film, which necessitates a slag removal operation after welding, or the oxide film becomes thicker than necessary and thus can easily peel off, which adversely affects the coating adhesion.

Accordingly, the total content of the silicon oxide, the chromium oxide, and the nickel oxide is specified to be 0.01 to 0.30 mass % based on the total mass of the wire. Furthermore, from the standpoint of improving the coating adhesion, the total content of the silicon oxide, the chromium oxide, and the nickel oxide is preferably from 0.015 to 0.15 mass % based on the total mass of the wire. The above-described effects can be achieved as long as at least one of the silicon oxide, chromium oxide, and nickel oxide is included.

The silicon oxide, the chromium oxide, and the nickel oxide are mostly included in the flux. That is, the flux contains at least one oxide of silicon oxide, chromium oxide, and nickel oxide. From the standpoint of improving the coating adhesion, the total content of these oxides is preferably from 0.1 to 1.0 mass % based on the total mass of the flux. This improves the coating adhesion further while reducing the formation of slag on the weld bead.

[S: Less than or Equal to 0.020 Mass % (Including 0 Mass %)]

S is an element that forms a low-melting point compound at the interface between the oxide film and the weld metal to degrade the adhesion of the oxide film and also induces hot cracking. If the S content is greater than 0.020 mass % based on the total mass of the wire, the coating adhesion decreases and the probability of hot cracking increases.

Accordingly, the S content is limited to less than or equal to 0.020 mass % based on the total mass of the wire. When the S content is limited to less than or equal to 0.009 mass % based on the total mass of the wire, the adhesion between the oxide film and the weld metal is further improved. Thus, this limitation is more preferable.

S is mostly included in the flux. From the standpoint of improving the coating adhesion, the S content in the flux, based on the total mass of the flux, is preferably limited to less than or equal to 0.025 mass %, and more preferably to less than or equal to 0.020 mass %. This improves the coating adhesion further.

[Al, Ca, Mg, K, and Na: Less than or Equal to 0.3 Mass % (Including 0 Mass %)]

Flux-cored wires may contain at least one deoxidizing agent added thereto, selected from the group consisting of aluminum, alkali metals, and alkaline earth metals, each in elemental or alloy form. However, these deoxidizing agents not only react with oxidizing gases in the shielding gas, but also remove oxygen from the silicon oxide, the chromium oxide, and the nickel oxide described above. The oxidized deoxidizing agents form part of the oxide film, and the silicon oxide, the chromium oxide, and the nickel oxide, when deoxidized, become metals and migrate into the weld metal without remaining in the oxide film. Thus, deoxidizing agents, if present in an excessive amount, have significant influence on the composition and the thickness of the oxide film.

In view of this, in the metallic flux-cored wire of this embodiment, the total content of Al, Ca, Mg, K, and Na is limited to less than or equal to 0.3 mass % based on the total mass of the wire, in order to form an oxide film having high adhesion. From the standpoint of improving the coating adhesion, the total content of Al, Ca, Mg, K, and Na is preferably limited to less than or equal to 0.2 mass % based on the total mass of the wire.

[P: Less than or Equal to 0.020 Mass % (Including 0 Mass %)]

P is an element that induces hot cracking and therefore the content is preferably as low as possible. Specifically, if the P content is greater than 0.020 mass % based on the total mass of the wire, the weld metal will have low hot cracking resistance.

Accordingly, the P content is preferably limited to less than or equal to 0.020 mass % based on the total mass of the wire. Furthermore, in view of the influence on the toughness and ductility of the weld metal, the limitation is preferably less than or equal to 0.015 mass %.

[Ti: Less than or Equal to 0.5 Mass % (Including 0 Mass %)]

Ti may sometimes be added as an arc stabilizing agent. However, if the content is greater than 0.5 mass % based on the total mass of the wire, the oxide film that forms on the bead may be affected. Accordingly, the Ti content is preferably limited to less than or equal to 0.5 mass % based on the total mass of the wire. The Ti content is the sum of the content of elemental Ti and the content of non-metallic Ti (e.g., titanium oxide) in terms of Ti.

[Balance]

In the composition of the metallic flux-cored wire of this embodiment, the balance is made up of Fe and incidental impurities. Examples of the incidental impurities in the metallic flux-cored wire of this embodiment include Nb and B. Furthermore, the metallic flux-cored wire of this embodiment may contain, in addition to the components described above, one or more other components added thereto to the extent of not interfering with the effects described above. Examples of such components include Mo, W, elemental Ni, and elemental Cr.

(Welding Method)

The metallic flux-cored wire of this embodiment is used for gas-shielded arc welding using, for example, as the shielding gas, argon gas, a mixed gas of argon and carbon dioxide, or a mixed gas of argon and oxygen.

Figure 2:
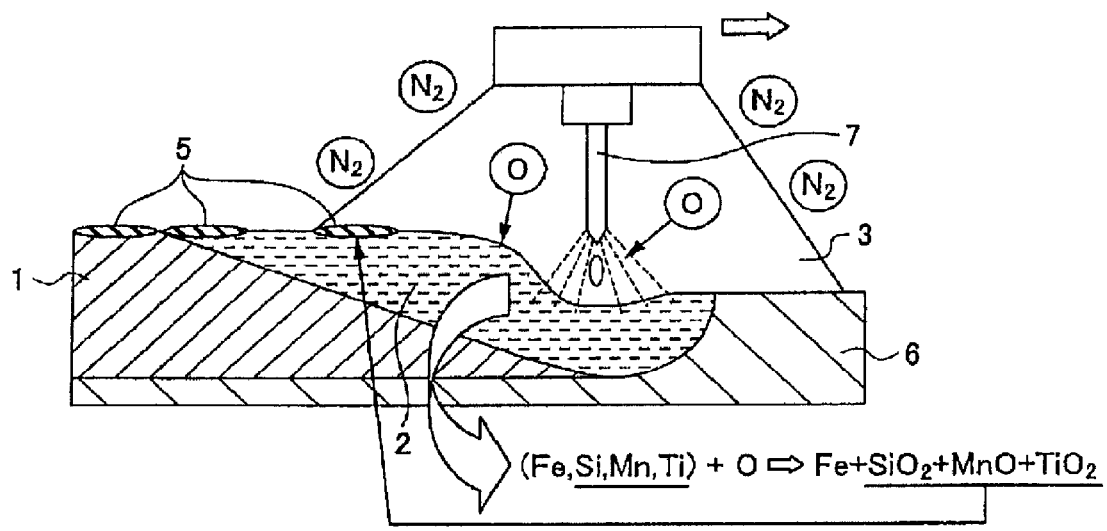
FIG. 2 is a schematic diagram illustrating a welding method using a metallic flux-cored wire according to an embodiment of the present invention.

FIG. 2 is a schematic diagram illustrating a welding method using a metallic flux-cored wire of this embodiment. Factors that may cause formation of slag 5 on the weld bead (weld metal 1), which is illustrated in FIG. 2, include contaminants settling on the steel sheet (base material 6), oxides (oxygen) in a welding wire 7, and oxygen in the shielding gas 3.

In view of this, in the welding method of this embodiment, it is preferred that a metallic flux-cored wire containing oxides in a very small amount be used as the welding wire 7 and a gas containing Ar in an amount of greater than or equal to 95 volume % based on the total volume of the shielding gas be used as the shielding gas 3. This results in a significant reduction in the amount of slag formed.

[Shielding Gas]

An oxidizing gas, if present in the shielding gas in an excessive amount, oxidizes the flux components, particularly the deoxidizing agents, to generate slag. When the slag is absorbed in the oxide film, the composition of the oxide film changes. Specifically, an oxidizing gas, if present in the shielding gas in an amount of greater than 5 volume % based on the total volume of the shielding gas, degrades the coating adhesion.

Thus, when the metallic flux-cored wire of this embodiment is used to perform gas-shielded arc welding, the proportions of the components in the shielding gas are preferably such that, based on the total volume of the shielding gas, Ar is present in an amount ranging from 95 to 100 volume % and an oxidizing gas(es) is present in an amount ranging from 0 to 5 volume %. The oxidizing gas mentioned above refers to, for example, $CO_2$, $O_2$, or a mixed gas of $CO_2$ and $O_2$, and at least one gas of $CO_2$ and $O_2$ is preferred.

[Workpiece]

In the welding method of this embodiment, the workpiece (base material 6 in FIGS. 1 and 2) is not particularly limited, but it is suitably a steel containing Si in an amount ranging from 0.1 to 1.0 mass % based on the total mass of the steel. Examples of the steel having such a composition include high-tensile steels having a tensile strength of 440 MPa or more.

The metallic flux-cored wire of this embodiment, when used for gas-shielded arc welding of such a steel, is particularly effective in improving the corrosion resistance of the heat affected zone.

In the metallic flux-cored wire of this embodiment, the contents of the elements that can affect the formation of the oxide film are each within the specified range. As a result, the oxide film that forms on the surface of the weld bead has high adhesion. Consequently, compared with related art welding methods, the coating adhesion at the weld is improved, and the weld bead, after being coated, has a long corrosion life.

EXAMPLES

Hereinafter, the effects of the present invention are specifically described by way of examples of the present invention and comparative examples. In this example, flux-cored wires of examples and comparative examples, each having a composition shown in Table 1 or 2 below, were used to perform lap fillet welding by gas-shielded arc welding on steel sheets of 2.3 mm thickness, each of which had a composition shown in Table 3 below. Shielding gases each having a composition shown in Table 4 below were used. The resultant welds were evaluated. The welding conditions included a welding current of 240 A and a welding speed of 100 cm/min.

In each of the wire compositions in Tables 1 and 2 below and in each of the steel sheet compositions in Table 3 below, the balance is Fe and incidental impurities. In Tables 1 and 2, the wire compositions (mass %) are indicated by mass percentages based on the total mass of each wire, and the S content in the fluxes (mass %) is indicated by mass percentages based on the total mass of each flux. In Table 3, the steel sheet compositions (mass %) are indicated by mass percentages based on the total mass of each steel sheet. In Table 4, the shielding gas compositions (volume %) are indicated by volume percentages based on the total volume of each shielding gas.

TABLE 1

| | | Wire composition (mass %) | | | | | | | | | | | | | | | S |
|---|---|---|---|---|---|---|---|---|---|---|---|---|---|---|---|---|---|
| | No. | C | Si | Mn | P | S | Al | Ca | Mg | K | Na | Total deoxidizing agent | Si oxide | Cr oxide | Ni oxide | Total oxide | content in flux (mass %) |
| Example | 1 | 0.02 | 0.7 | 2.0 | 0.008 | 0.008 | 0.05 | 0.00 | 0.00 | 0.10 | 0.00 | 0.15 | 0.05 | 0.10 | 0.00 | 0.15 | 0.005 |
| | 2 | 0.15 | 0.5 | 0.5 | 0.009 | 0.009 | 0.00 | 0.10 | 0.00 | 0.00 | 0.00 | 0.10 | 0.10 | 0.15 | 0.00 | 0.25 | 0.007 |
| | 3 | 0.12 | 0.3 | 1.5 | 0.010 | 0.008 | 0.00 | 0.00 | 0.10 | 0.00 | 0.10 | 0.20 | 0.20 | 0.10 | 0.00 | 0.30 | 0.005 |
| | 4 | 0.06 | 1.5 | 0.9 | 0.010 | 0.009 | 0.00 | 0.10 | 0.00 | 0.10 | 0.00 | 0.20 | 0.10 | 0.05 | 0.05 | 0.20 | 0.010 |
| | 5 | 0.08 | 0.9 | 0.3 | 0.008 | 0.010 | 0.00 | 0.10 | 0.00 | 0.00 | 0.10 | 0.20 | 0.10 | 0.00 | 0.10 | 0.20 | 0.013 |
| | 6 | 0.04 | 1.2 | 2.5 | 0.009 | 0.008 | 0.00 | 0.00 | 0.10 | 0.05 | 0.00 | 0.15 | 0.00 | 0.10 | 0.15 | 0.25 | 0.005 |
| | 7 | 0.05 | 0.3 | 0.5 | 0.010 | 0.010 | 0.30 | 0.00 | 0.00 | 0.00 | 0.00 | 0.30 | 0.03 | 0.00 | 0.00 | 0.03 | 0.014 |
| | 8 | 0.03 | 0.4 | 1.2 | 0.008 | 0.010 | 0.00 | 0.30 | 0.00 | 0.00 | 0.00 | 0.30 | 0.05 | 0.00 | 0.00 | 0.05 | 0.015 |
| | 9 | 0.07 | 0.8 | 1.6 | 0.008 | 0.009 | 0.00 | 0.00 | 0.30 | 0.00 | 0.00 | 0.30 | 0.10 | 0.00 | 0.00 | 0.10 | 0.011 |
| | 10 | 0.04 | 0.7 | 1.6 | 0.009 | 0.010 | 0.00 | 0.00 | 0.00 | 0.30 | 0.00 | 0.30 | 0.05 | 0.00 | 0.00 | 0.05 | 0.015 |
| | 11 | 0.06 | 1.2 | 1.3 | 0.010 | 0.010 | 0.00 | 0.00 | 0.00 | 0.00 | 0.30 | 0.30 | 0.03 | 0.00 | 0.00 | 0.03 | 0.016 |
| | 12 | 0.09 | 0.5 | 1.9 | 0.008 | 0.010 | 0.15 | 0.10 | 0.00 | 0.00 | 0.00 | 0.25 | 0.10 | 0.00 | 0.00 | 0.10 | 0.016 |
| | 13 | 0.08 | 1.5 | 1.5 | 0.008 | 0.010 | 0.00 | 0.10 | 0.00 | 0.10 | 0.10 | 0.30 | 0.00 | 0.00 | 0.10 | 0.10 | 0.012 |
| | 14 | 0.07 | 0.9 | 1.7 | 0.009 | 0.010 | 0.05 | 0.15 | 0.00 | 0.00 | 0.00 | 0.20 | 0.10 | 0.10 | 0.00 | 0.20 | 0.015 |
| | 15 | 0.09 | 0.7 | 1.4 | 0.010 | 0.010 | 0.05 | 0.05 | 0.05 | 0.05 | 0.05 | 0.25 | 0.00 | 0.10 | 0.10 | 0.20 | 0.012 |
| | 16 | 0.12 | 0.8 | 1.9 | 0.009 | 0.009 | 0.05 | 0.00 | 0.10 | 0.05 | 0.00 | 0.20 | 0.10 | 0.10 | 0.10 | 0.30 | 0.010 |
| | 17 | 0.13 | 0.4 | 1.3 | 0.008 | 0.009 | 0.00 | 0.05 | 0.10 | 0.00 | 0.00 | 0.15 | 0.01 | 0.00 | 0.00 | 0.01 | 0.008 |
| | 18 | 0.07 | 0.5 | 1.2 | 0.010 | 0.010 | 0.10 | 0.00 | 0.00 | 0.10 | 0.00 | 0.20 | 0.30 | 0.00 | 0.00 | 0.30 | 0.014 |
| | 19 | 0.09 | 0.6 | 1.2 | 0.007 | 0.009 | 0.00 | 0.05 | 0.00 | 0.10 | 0.00 | 0.15 | 0.00 | 0.01 | 0.00 | 0.01 | 0.008 |
| | 20 | 0.05 | 0.6 | 1.5 | 0.009 | 0.010 | 0.00 | 0.10 | 0.00 | 0.00 | 0.05 | 0.15 | 0.00 | 0.30 | 0.00 | 0.30 | 0.013 |
| | 21 | 0.06 | 0.8 | 2.0 | 0.008 | 0.010 | 0.00 | 0.00 | 0.00 | 0.00 | 0.00 | 0.00 | 0.00 | 0.00 | 0.01 | 0.01 | 0.015 |
| | 22 | 0.08 | 0.5 | 2.2 | 0.009 | 0.026 | 0.00 | 0.00 | 0.10 | 0.10 | 0.00 | 0.20 | 0.00 | 0.00 | 0.30 | 0.30 | 0.110 |

TABLE 1-continued

|  | Wire composition (mass %) | | | | | | | | | | | | | | | S content in flux (mass %) |
| --- | --- | --- | --- | --- | --- | --- | --- | --- | --- | --- | --- | --- | --- | --- | --- | --- |
| No. | C | Si | Mn | P | S | Al | Ca | Mg | K | Na | Total deoxidizing agent | Si oxide | Cr oxide | Ni oxide | Total oxide | |
| 23 | 0.06 | 0.6 | 1.4 | 0.008 | 0.010 | 0.00 | 0.10 | 0.00 | 0.10 | 0.05 | 0.25 | 0.12 | 0.05 | 0.00 | 0.17 | 0.012 |
| 24 | 0.08 | 0.7 | 1.6 | 0.010 | 0.010 | 0.05 | 0.05 | 0.00 | 0.10 | 0.00 | 0.20 | 0.04 | 0.00 | 0.02 | 0.06 | 0.015 |
| 25 | 0.09 | 0.9 | 0.7 | 0.009 | 0.010 | 0.05 | 0.00 | 0.05 | 0.10 | 0.00 | 0.20 | 0.20 | 0.05 | 0.05 | 0.30 | 0.017 |

TABLE 2

| | | Wire composition (mass %) | | | | | | | | | | | | | | | S content in flux (mass %) |
| --- | --- | --- | --- | --- | --- | --- | --- | --- | --- | --- | --- | --- | --- | --- | --- | --- | --- |
| | No. | C | Si | Mn | P | S | Al | Ca | Mg | K | Na | Total deoxidizing agent | Si oxide | Cr oxide | Ni oxide | Total oxide | |
| Example | 26 | 0.10 | 0.8 | 1.2 | 0.010 | 0.008 | 0.00 | 0.05 | 0.05 | 0.00 | 0.00 | 0.10 | 0.05 | 0.05 | 0.00 | 0.10 | 0.005 |
| | 27 | 0.12 | 0.5 | 1.5 | 0.009 | 0.009 | 0.10 | 0.00 | 0.00 | 0.10 | 0.00 | 0.20 | 0.10 | 0.00 | 0.05 | 0.15 | 0.008 |
| | 28 | 0.04 | 0.9 | 1.6 | 0.009 | 0.010 | 0.00 | 0.10 | 0.00 | 0.00 | 0.00 | 0.10 | 0.05 | 0.10 | 0.00 | 0.15 | 0.016 |
| | 29 | 0.07 | 1.2 | 1.4 | 0.009 | 0.011 | 0.00 | 0.00 | 0.10 | 0.00 | 0.00 | 0.10 | 0.05 | 0.10 | 0.05 | 0.20 | 0.020 |
| | 30 | 0.09 | 1.2 | 1.6 | 0.009 | 0.011 | 0.00 | 0.05 | 0.05 | 0.05 | 0.00 | 0.15 | 0.10 | 0.05 | 0.00 | 0.15 | 0.020 |
| | 31 | 0.09 | 1.0 | 1.5 | 0.009 | 0.011 | 0.00 | 0.10 | 0.05 | 0.05 | 0.00 | 0.20 | 0.10 | 0.05 | 0.05 | 0.20 | 0.020 |
| | 32 | 0.09 | 1.2 | 1.6 | 0.009 | 0.011 | 0.00 | 0.05 | 0.05 | 0.05 | 0.00 | 0.15 | 0.10 | 0.05 | 0.00 | 0.15 | 0.020 |
| | 33 | 0.05 | 1.0 | 1.4 | 0.008 | 0.010 | 0.05 | 0.00 | 0.00 | 0.00 | 0.00 | 0.05 | 0.00 | 0.00 | 0.05 | 0.05 | 0.015 |
| | 34 | 0.60 | 1.0 | 1.2 | 0.008 | 0.010 | 0.00 | 0.00 | 0.00 | 0.05 | 0.00 | 0.05 | 0.00 | 0.05 | 0.00 | 0.05 | 0.015 |
| Comparative example | 35 | 0.35 | 0.4 | 0.6 | 0.010 | 0.010 | 0.05 | 0.00 | 0.00 | 0.00 | 0.00 | 0.05 | 0.05 | 0.00 | 0.00 | 0.05 | 0.013 |
| | 36 | 0.12 | 0.2 | 1.2 | 0.011 | 0.010 | 0.00 | 0.00 | 0.05 | 0.10 | 0.00 | 0.15 | 0.00 | 0.10 | 0.05 | 0.15 | 0.015 |
| | 37 | 0.03 | 1.6 | 0.4 | 0.008 | 0.009 | 0.00 | 0.05 | 0.00 | 0.00 | 0.00 | 0.05 | 0.05 | 0.00 | 0.00 | 0.05 | 0.010 |
| | 38 | 0.03 | 0.6 | 2.6 | 0.009 | 0.009 | 0.00 | 0.10 | 0.00 | 0.05 | 0.00 | 0.15 | 0.00 | 0.05 | 0.10 | 0.15 | 0.009 |
| | 39 | 0.07 | 0.6 | 0.9 | 0.010 | 0.009 | 0.10 | 0.10 | 0.10 | 0.10 | 0.00 | 0.40 | 0.05 | 0.00 | 0.00 | 0.05 | 0.008 |
| | 40 | 0.08 | 0.4 | 1.4 | 0.008 | 0.009 | 0.05 | 0.05 | 0.10 | 0.10 | 0.05 | 0.35 | 0.05 | 0.00 | 0.00 | 0.05 | 0.010 |
| | 41 | 0.06 | 0.6 | 0.7 | 0.008 | 0.009 | 0.00 | 0.35 | 0.00 | 0.00 | 0.00 | 0.35 | 0.00 | 0.05 | 0.10 | 0.15 | 0.008 |
| | 42 | 0.09 | 0.7 | 1.4 | 0.010 | 0.010 | 0.00 | 0.00 | 0.35 | 0.00 | 0.00 | 0.35 | 0.00 | 0.00 | 0.05 | 0.05 | 0.013 |
| | 43 | 0.05 | 0.5 | 0.9 | 0.012 | 0.010 | 0.00 | 0.00 | 0.00 | 0.00 | 0.05 | 0.05 | 0.00 | 0.00 | 0.00 | 0.00 | 0.014 |
| | 44 | 0.06 | 1.1 | 1.5 | 0.010 | 0.011 | 0.00 | 0.00 | 0.05 | 0.00 | 0.00 | 0.05 | 0.10 | 0.15 | 0.10 | 0.35 | 0.018 |
| | 45 | 0.08 | 1.2 | 0.8 | 0.008 | 0.010 | 0.00 | 0.00 | 0.00 | 0.05 | 0.10 | 0.15 | 0.20 | 0.10 | 0.05 | 0.35 | 0.012 |
| | 46 | 0.13 | 0.7 | 1.8 | 0.009 | 0.010 | 0.05 | 0.00 | 0.00 | 0.00 | 0.00 | 0.05 | 0.10 | 0.15 | 0.15 | 0.40 | 0.013 |
| | 47 | 0.01 | 0.9 | 0.9 | 0.010 | 0.011 | 0.00 | 0.00 | 0.00 | 0.10 | 0.00 | 0.10 | 0.05 | 0.10 | 0.00 | 0.15 | 0.022 |

TABLE 3

| | Steel sheet composition (mass %) | | |
| --- | --- | --- | --- |
| No. | C | Si | Mn |
| A | 0.07 | 0.15 | 1.5 |
| B | 0.06 | 0.50 | 1.5 |
| C | 0.05 | 1.00 | 1.5 |
| D | 0.05 | 0.08 | 1.5 |
| E | 0.8 | 0.07 | 0.9 |

TABLE 4

| | Shielding gas composition (volume %) | | |
| --- | --- | --- | --- |
| No. | Ar | $CO_2$ | $O_2$ |
| a | 100 | 0 | 0 |
| b | 95 | 5 | 0 |
| c | 98 | 0 | 2 |
| d | 97 | 2 | 1 |
| e | 92 | 0 | 8 |
| f | 90 | 10 | 0 |

The specimens of the examples and the comparative examples were evaluated in the following manner.

<Presence or Absence of Slag>

The specimens, immediately after welding, were observed visually and by using a microscope. Specimens on which no slag formed at or near the bead were evaluated as ○ (good), specimens on which pieces of slag of not longer than 1 mm and formed intermittently were evaluated as Δ (fair), and specimens on which pieces of slag of longer than 1 mm and formed intermittently or continuously were evaluated as x (poor).

<Oxide Film Adhesion>

Cellophane tape (registered trademark) No. 252, manufactured by SEKISUI CHEMICAL CO., LTD., was placed on the weld of each specimen 24 hours or more after welding in such a manner that there was no air bubble when visually observed. The tape was peeled at such a speed that it was entirely separated within one second, and the area of the oxide film adhering to the tape was measured. Evaluations of the adhesion on the bead were made as follows. Based on the area of the bead in close contact with the tape, specimens on which the area of delamination of the oxide film was less than 5% were evaluated as ○ (good), specimens on which the area of delamination was from 5% or more to 10% or less were evaluated as Δ (fair), and specimens on which the area of delamination was greater than 10% were evaluated as x (poor). With regard to the adhesion on the heat affected zone (HAZ), specimens that had two or less delaminated regions were evaluated as ○ (good) and specimens that had three or more delaminated regions were evaluated as x (poor).

<Hot Cracking>

A FISCO test was conducted in accordance with JIS Z 3155:1933. In the test, the welding current was set to 280 A, and the welding speed was set to 70, 100, or 120 cm/min. Subsequently, an X-ray radiographic test was conducted, and specimens that exhibited cracking were evaluated as x (poor) and specimens that exhibited no cracking were evaluated as ○ (good).

The results of the foregoing are summarized in Table 5 below.

TABLE 5

| | | Steel sheet | Shielding gas | Presence or absence of slag | Adhesion of oxide film | | Hot cracking |
|---|---|---|---|---|---|---|---|
| | No. | | | | HAZ | Bead | |
| Example | 1 | B | a | ○ | ○ | ○ | ○ |
| | 2 | A | b | ○ | ○ | ○ | ○ |
| | 3 | C | c | ○ | ○ | ○ | ○ |
| | 4 | A | d | ○ | ○ | ○ | ○ |
| | 5 | B | a | ○ | ○ | ○ | ○ |
| | 6 | A | b | ○ | ○ | ○ | ○ |
| | 7 | B | a | ○ | ○ | ○ | ○ |
| | 8 | C | b | ○ | ○ | ○ | ○ |
| | 9 | A | b | ○ | ○ | ○ | ○ |
| | 10 | C | a | ○ | ○ | ○ | ○ |
| | 11 | A | c | ○ | ○ | ○ | ○ |
| | 12 | B | d | ○ | ○ | ○ | ○ |
| | 13 | A | d | ○ | ○ | ○ | ○ |
| | 14 | A | a | ○ | ○ | ○ | ○ |
| | 15 | C | c | ○ | ○ | ○ | ○ |
| | 16 | A | d | ○ | ○ | ○ | ○ |
| | 17 | A | b | ○ | ○ | ○ | ○ |
| | 18 | B | a | ○ | ○ | ○ | ○ |
| | 19 | C | c | ○ | ○ | ○ | ○ |
| | 20 | A | d | ○ | ○ | ○ | ○ |
| | 21 | C | a | ○ | ○ | ○ | ○ |
| | 22 | A | c | ○ | ○ | ○ | ○ |
| | 23 | B | a | ○ | ○ | ○ | ○ |
| | 24 | A | b | ○ | ○ | ○ | ○ |
| | 25 | C | d | ○ | ○ | ○ | ○ |
| | 26 | A | c | ○ | ○ | ○ | ○ |
| | 27 | B | a | ○ | ○ | ○ | ○ |
| | 28 | A | b | ○ | ○ | ○ | ○ |
| | 29 | A | d | ○ | ○ | ○ | ○ |
| | 30 | D | a | ○ | △ | ○ | ○ |
| | 31 | D | a | ○ | △ | ○ | ○ |
| | 32 | E | a | ○ | △ | ○ | ○ |
| | 33 | B | e | △ | ○ | ○ | ○ |
| | 34 | A | f | △ | ○ | ○ | ○ |
| Comparative example | 35 | A | a | ○ | ○ | ○ | X |
| | 36 | B | a | ○ | ○ | X | ○ |
| | 37 | C | c | ○ | ○ | ○ | X |
| | 38 | A | a | ○ | ○ | ○ | X |
| | 39 | A | b | ○ | ○ | X | ○ |
| | 40 | C | a | ○ | ○ | X | ○ |
| | 41 | A | c | ○ | ○ | X | ○ |
| | 42 | B | a | ○ | ○ | X | ○ |
| | 43 | A | b | ○ | ○ | X | ○ |
| | 44 | C | a | X | ○ | ○ | ○ |
| | 45 | A | c | X | ○ | ○ | ○ |
| | 46 | B | a | X | ○ | ○ | ○ |
| | 47 | A | c | ○ | ○ | X | ○ |

As shown in Table 5 above, in No. 35, the metallic flux-cored wire had a C content of greater than 0.3 mass % based on the total mass of the wire, and as a result, the weld metal exhibited hot cracking. In No. 36, the metallic flux-cored wire had a Si content of less than 0.3 mass % based on the total mass of the wire, and as a result, the oxide film had low adhesion. On the other hand, in No. 37, the metallic flux-cored wire had a Si content of greater than 1.5 mass % based on the total mass of the wire, and as a result, the weld metal exhibited hot cracking.

In No. 38, the metallic flux-cored wire had a Mn content of greater than 2.5 mass % based on the total mass of the wire, and as a result, the weld metal exhibited hot cracking. In Nos. 39 to 42, the metallic flux-cored wires had a total content of Al, Ca, Mg, K, and Na, each in elemental or alloy form, of greater than 0.3 mass % based on the total mass of the wire, and as a result, all the oxide films had low adhesion.

In No. 43, the metallic flux-cored wire had a total content of Si oxide, Cr oxide, and Ni oxide of less than 0.01 mass % based on the total mass of the wire, and as a result, the oxide film had low adhesion. On the other hand, in Nos. 44 to 46, the metallic flux-cored wires had a total content of Si oxide, Cr oxide, and Ni oxide of greater than 0.30 mass % based on the total mass of the wire, and as a result, slag formed on both a middle region of the bead and a toe region of the bead. In No. 47, the metallic flux-cored wire had a C content of less than 0.02 mass % based on the total mass of the wire, and as a result, the oxide film had low adhesion.

In contrast, in Nos. 1 to 34, the metallic flux-cored wires achieved good hot cracking resistance and excellent coating adhesion of the weld. However, in No. 33, a shielding gas containing $O_2$ in an amount of greater than 5 volume % based on the total volume of the shielding gas was used, and in No. 34, a shielding gas containing $CO_2$ in an amount of greater than 5 volume % based on the total volume of the shielding gas was used, and as a result, pieces of slag, not greater than 1 mm in length, formed intermittently.

The foregoing results demonstrate that the present invention achieves a weld having good hot cracking resistance and excellent coating adhesion.

Embodiments of the present invention may be configured as follows.

[1] A metallic flux-cored wire for gas-shielded arc welding, the metallic flux-cored wire including a steel sheath filled with a flux, the metallic flux-cored wire including, based on the total mass of the wire, C in an amount ranging from 0.02 to 0.30 mass %, Si in an amount ranging from 0.3 to 1.5 mass %, Mn in an amount ranging from 0.3 to 2.5 mass %, at least one oxide selected from the group consisting of silicon oxide, chromium oxide, and nickel oxide in a total amount ranging from 0.01 to 0.30 mass %, S in an amount of less than or equal to 0.020 mass %, and Al, Ca, Mg, K, and Na each in elemental or alloy form in a total amount of less than or equal to 0.3 mass %, with the balance being Fe and incidental impurities.

[2] The metallic flux-cored wire for gas-shielded arc welding according to the above [1], wherein a P content is less than or equal to 0.020 mass % based on the total mass of the wire.

[3] The metallic flux-cored wire for gas-shielded arc welding according to the above [1] or [2], wherein a S content in the metallic flux is less than or equal to 0.025 mass % based on the total mass of the metallic flux.

[4] The metallic flux-cored wire for gas-shielded arc welding according to any one of the above [1] to [3], wherein a Ti content is less than or equal to 0.5 mass % based on the total mass of the wire.

[5] The metallic flux-cored wire for gas-shielded arc welding according to any one of the above [1] to [4], wherein the S content is less than or equal to 0.009 mass % based on the total mass of the wire.

[6] A welding method including gas-shielded arc welding a workpiece by using the metallic flux-cored wire according to any one of the above [1] to [5], the workpiece being a steel containing Si in an amount ranging from 0.1 to 1.0 mass % based on the total mass of the steel.

[7] The welding method according to the above [6], wherein the method uses a shielding gas containing, based on the total volume of the shielding gas, Ar in an amount ranging from 95 to 100 volume % and an oxidizing gas in an amount ranging from 0 to 5 volume %.

[8] The welding method according to the above [7], wherein the oxidizing gas is at least one gas of $CO_2$ and $O_2$.

Although the present invention has been described in detail with reference to particular embodiments, it will be apparent to those skilled in the art that various changes and modifications may be made thereto without departing from the spirit and scope of the invention. The present application is based on Japanese patent application No. 2015-091985, filed on Apr. 28, 2015, the contents of which are incorporated herein by reference.

REFERENCE SIGNS LIST

1 Weld Metal
2 Molten Pool
3 Shielding Gas
4 Oxide Film
5 Slag
6 Base Material
7 Welding Wire

The invention claimed is:

1. A metallic flux-cored wire of a steel sheath filled with a metallic flux,
the metallic flux-cored wire comprising, based on a total mass of the metallic flux-cored wire:
C in an amount ranging from 0.02 to 0.13 mass %;
Si in an amount ranging from 0.3 to 1.5 mass %;
Mn in an amount ranging from 0.3 to 2.5 mass %;
at least one oxide selected from the group consisting of silicon oxide, chromium oxide, and nickel oxide in a total amount ranging from 0.01 to 0.30 mass %;
S in an amount of less than or equal to 0.020 mass %;
Al, Ca, Mg, K, and Na each in elemental or alloy form, in a total amount of less than or equal to 0.3 mass %; and
Fe.

2. The metallic flux-cored wire according to claim 1, wherein a P content in the metallic flux-cored wire is less than or equal to 0.020 mass % based on the total mass of the metallic flux-cored wire.

3. The metallic flux-cored wire according to claim 1, wherein a S content in the metallic flux is less than or equal to 0.025 mass % based on a total mass of the metallic flux.

4. The metallic flux-cored wire according to claim 1, wherein a Ti content in the metallic flux-cored wire is less than or equal to 0.5 mass % based on the total mass of the metallic flux-cored wire.

5. The metallic flux-cored wire according claim 1, wherein a S content in the metallic flux-cored wire is less than or equal to 0.009 mass % based on the total mass of the metallic flux-cored wire.

6. A welding method, comprising:
welding a workpiece via gas-shielded arc welding with the metallic flux-cored wire according to claim 1,
wherein the workpiece is a steel comprising Si in an amount ranging from 0.1 to 1.0 mass % based on a total mass of the steel.

7. The welding method according to claim 6, wherein said welding is carried out with a shielding gas comprising, based on a total volume of the shielding gas, Ar in an amount ranging from 95 to 100 volume % and an oxidizing gas in an amount ranging from 0 to 5 volume %.

8. The welding method according to claim 7, wherein the oxidizing gas is at least one gas selected from the group consisting of $CO_2$ and $O_2$.

9. The metallic flux-cored wire according to claim 1, wherein the metallic flux-cored wire has an outside diameter ranging from 0.8 to 2.0 mm.

10. The metallic flux-cored wire according to claim 1, wherein a content of the metallic flux ranges from 10 to 25 mass % based on the total mass of the metallic flux-cored wire.

11. The metallic flux-cored wire according to claim 1, wherein a total content of silicon oxide, chromium oxide, and nickel oxide in the metallic flux ranges from 0.1 to 1.0 mass % based on a total mass of the metallic flux.

* * * * *